UNITED STATES PATENT OFFICE.

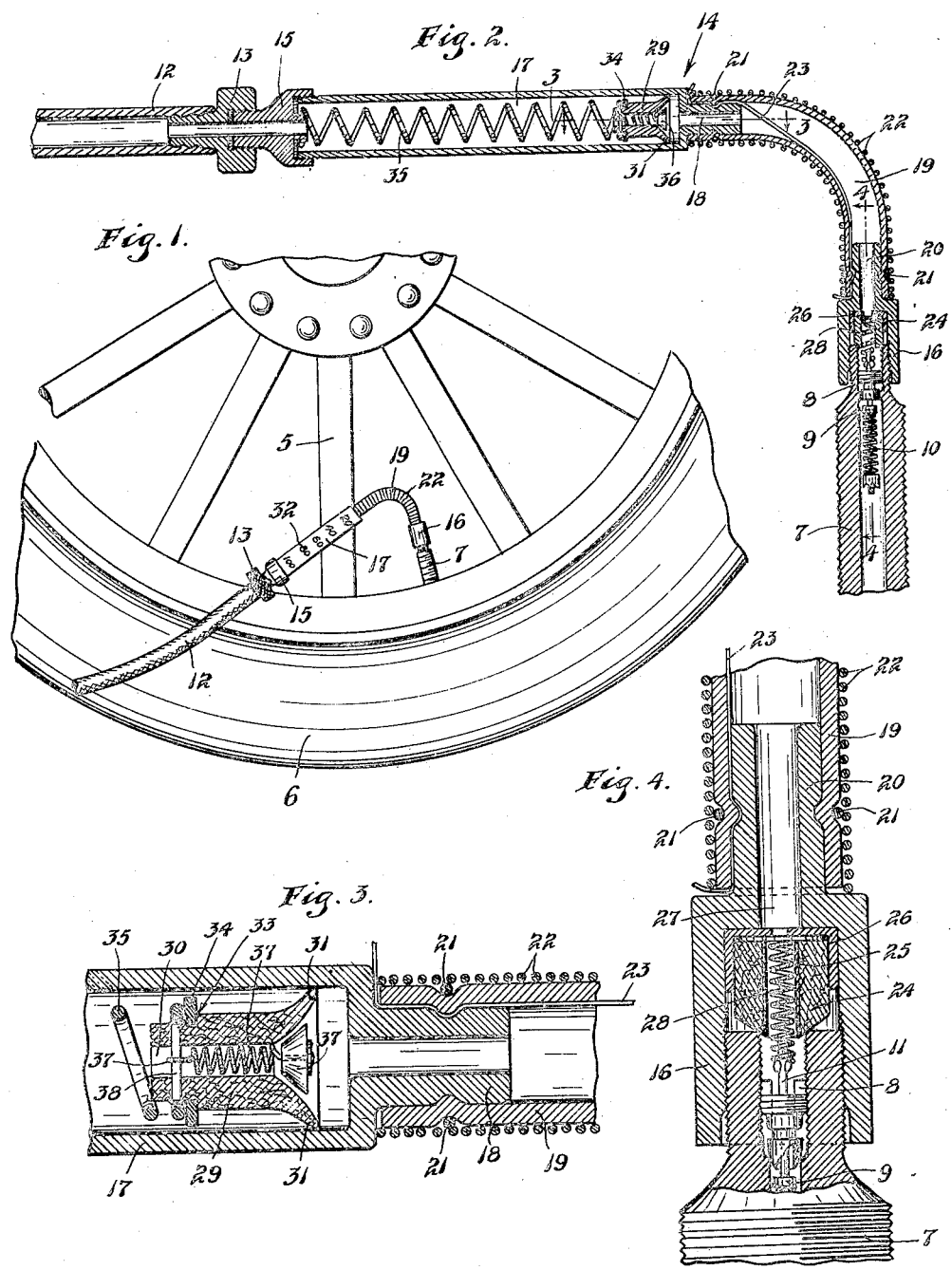

DAVID D. GETMAN, OF WHITE BUTTE, SOUTH DAKOTA.

TIRE-CHARGING TUBE AND TESTER.

1,357,633. Specification of Letters Patent. Patented Nov. 2, 1920.

Application filed February 11, 1920. Serial No. 357,794.

*To all whom it may concern:*

Be it known that I, DAVID D. GETMAN, a citizen of the United States, residing at White Butte, in the county of Perkins and State of South Dakota, have invented certain new and useful Improvements in Tire-Charging Tubes and Testers; and I do hereby declare the following to be a full, clear, and exact description of the invention, such as will enable others skilled in the art to which it appertains to make and use the same.

My invention has for its object to provide an extremely simple and highly efficient tire air-charging tube and tester; and, to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a fragmentary view in side elevation of the invention attached to the valve stem of a pneumatic tire mounted on an automobile wheel;

Fig. 2 is a view principally in longitudinal central section, on an enlarged scale;

Fig. 3 is a detail view principally in longitudinal central section taken on the line 3—3 of Fig. 2, on an enlarged scale; and Fig. 4 is a detail view principally in longitudinal central section taken on the line 4—4 of Fig. 2, on an enlarged scale.

The numeral 5 indicates an automobile wheel having mounted thereon a pneumatic tire 6, the valve stem of which is indicated by the numeral 7. Within the valve stem 7 is the customary valve core, indicated as an entirety by the numeral 8, with the exception of its valve 9 normally closed by a coiled spring 10 and having a shouldered stem 11, which projects outward of said valve core. To charge the tire 6, it is now the general custom to use a charging hose 12, leading from a hand pump or power air compressor, not shown, and having at its delivery end an internally threaded coupling 13 adapted to be applied to the valve stem 7. By this method of charging a tire, it is necessary to detach the coupling 13 from the valve stem 7 and test the air pressure in the tire 6, usually several times before the right pressure is obtained, by applying a tire tester directly to the valve stem 7.

My present invention provides an air-charging tube and tester adapted to be applied to the charging hose 12 by means of the coupling 13, and forms a section or extension thereof. The air-charging tube is provided with a coupling for connecting the same to the valve stem 7. By the use of this invention, it is possible to charge a tire to a predetermined pressure without detaching the charging hose from the valve stem 7.

The invention, as an entirety, affords an air-charging member 14 having at one end an externally screw-threaded coupling 15 adapted to be screwed into the coupling 13 to detachably connect said member to the charging hose 12. On the other end of the air-charging member 14 is a coupling 16 in the form of an internally screw-threaded sleeve adapted to be screwed onto the valve stem 7 and detachably connect said member thereto. By reference to Fig. 4, it will be noted that the sleeve is not screw-threaded at its outer edge portion to act as a guide in applying said sleeve to the valve stem 7, thus making it easy to connect the screw threads.

The air-charging member 14 comprises two sections, one of which is in the form of a transparent testing tube 17, and the other of which is in the form of a rubber hose. One end of the testing tube 17 is attached to the coupling 15, and on the other end of the said tube is a nipple 18, over which is telescoped one end of the hose section 19. The other end of the hose section 19 is telescoped over a nipple 20 formed with the coupling 16. As shown, the hose section 19 is secured to the nipples 18 and 20 by forming in said nipples annular grooves, into which the end portions of the section 19 are pressed by means of cords or wires 21 tied around said hose section. To protect and reinforce the hose section 19, there is telescoped thereover a sleeve 22 in the form of a closely coiled wire. An anchor cord 23 is provided to prevent the hose section 19 and its sleeve 22 from longitudinally stretching. The ends of this anchor cord 23 are inserted between the hose section 19 and nipples 18 and 20, and are secured to said nipples by the ties 21. As shown in Fig. 2, the anchor cord 23 extends obliquely through the hose section 19 and the ends thereof are secured to opposite sides of the nipples 18 and 20. It is, of course, evident that if the sleeve 22 stretched longitudinally, the hose section 19 would blow out between the convolution of said sleeve.

To seal the joint between the valve stem 7 and coupling 16, there is provided a packing 24, of rubber, cork or other suitable material, having an axial bore in which is secured a metal tube 25. This packing 24 is mounted in a cup-like holder 26, which is held in the coupling 16 by pressing the same therein. In the bottom of the holder 26 is an opening 27, which completes the air passageway from the nipple 20, through the packing 24 and into the valve stem 7. The end of the packing 24, which engages the valve stem 7, is preferably of conical form, so as to enter the passageway in said valve stem and bear against the inner edge thereof, as shown in Fig. 4, to insure an air-tight joint.

To automatically open the valve 9, when the coupling 16 is applied to the valve stem 7, there is provided a yielding plunger 28 in the form of a coiled spring mounted in the tube 25. The plunger 28 is secured in the tube 25 by materially increasing its inner convolution and inserting the same between the packing 24 and the bottom of the holder 26. The outer end of the plunger 28 extends outward of the tube 25 and is adapted to be telescoped onto the valve stem 11 and engage the shoulders thereon, as shown in Fig. 4.

The purpose of making the plunger 28 so that the same will longitudinally yield, is to permit the coupling 16 to be screwed onto the valve stem 7 various different distances. The spring from which the plunger 28 is made must, of course, be of such strength as to overcome the valve spring 10 and open the valve 9. When the coupling 16 is detached from the valve stem 7, the spring 10 automatically closes the valve 9.

A cylindrical indicator 29, having an axial passageway 30, is mounted in the testing tube 17 for longitudinal movement therein. This indicator head 29 is of a diameter considerably less than the internal diameter of the testing tube 17, and is provided with a bell-shaped mouth, at its end nearest the nipple 18, to afford an annular flange 31, which bears against the internal wall of said testing tube. Graduations 32, indicating pounds, are marked or otherwise formed on the testing tube 17, and with which the flange 31 coöperates to indicate the number of pounds of air pressure in a tire. Preferably, the indicator head 29 is made of pliable material, such as rubber or cork, so that its flange 31 will yieldingly bear against the inner wall of the testing tube 17 and form an air-tight joint therebetween during the testing of the tire.

On the small end of the indicator head 29, and bearing against an annular shoulder 33, is a washer 34 of a diameter slightly less than that of the interior of the testing tube 17, so as to permit a free passage of air therearound. The purpose of the washer 34 is to limit the radial movement of the end of the indicator head 29, to which it is attached, by the engagement of said washer with the testing tube. A coiled spring 35 is placed in the testing tube 17, with one of its ends arranged to bear against the coupling 15 as a base of resistance, and with its other end encircling the small end of the indicator head 29 with sufficient force to connect said spring to the indicator head 29.

The passageway 30, in the indicator head 29, is normally closed by a check valve 36 arranged to close with the pressure in the tire 6 and yieldingly seat against the internal wall of the bell-shaped mouth of the indicator head 29. A coiled spring 37, anchored at one end to the check valve 36 and at its other end to a transverse pin 38 secured in the walls of the indicator head 29, yieldingly holds the check valve 36 closed.

*Operation.*

The operation of the above described invention may be briefly described as follows:—

To inflate the tire 6, the charging hose 12 may be attached to the valve stem 7 by securing the coupling 16 onto said valve stem. As previously stated, the application of the coupling 16 to the valve stem 7 automatically opens the valve 9 by the engagement of the yielding plunger 28 with the valve stem 11. If the charging hose 12 leads from a hand pump, said pump may be operated to force air therethrough, or if said hose leads from a power air compressor, the cut-off valve in said hose may be opened.

Air, under pressure from the charging hose 12, will enter the testing tube 17 through the coupling 15, open the valve 36 against the action of the spring 37, and enter the flexible section 19 through the nipple 18. A portion of the air may also pass around the indicator head 29 and escape into the flexible section 19 by passing between the inner wall of the testing tube 17 and the yielding flange 31. From the valve section 19, the air will pass through the coupling 16, around the open valve 9, and enter the tire through the valve stem 7.

To test the air pressure in the tire, it is only necessary to stop the action of the hand pump or close the cut-off valve in the charging hose 12. As soon as the air pressure is cut off to the tire 6, the air in said tire will close the check valve 36 with the assistance of its spring 37. Said air pressure in the tire 6 will then react against the bell-shaped mouth of the indicator head 29 and move said indicator head longitudinally in the testing tube 17 against the tension of the spring 35. This air pressure in the bell-shaped mouth of the indicator head 29 will tend to expand the flange 31 and press the same against the internal wall of the testing tube 17 to afford an airtight joint. When the indicator head 29 stops, in the testing tube 17, the position thereof may be read by means of the scale 32 to indicate the number of pounds of air pressure in the tire. If the air pressure is not sufficient in the tire, the air pressure in the charging tube 12 may be again released and another test made, as above described. When the desired air pressure is obtained in the tire, the coupling 16 may be unscrewed from the valve stem 7 and the valve 9 automatically closes as soon as the tension of the plunger 28 thereon is released.

By providing the improved tire charging tube and tester with the flexible section 19, it is possible to turn the charging tube 17 into various different positions to facilitate the reading of the graduations 32 thereon and the application of the device to a valve stem or the removal of the same therefrom.

What I claim is:

1. A device of the kind described including a graduated transparent testing tube adapted to be applied to an air-charging hose, a coupling for connecting the testing tube to a valve stem and having means for automatically opening the valve in said stem, a movable indicator head mounted in the testing tube for closing the same and for coöperation with graduations thereon, an air passageway in the indicator head, and a check valve in said passageway arranged to close with the air pressure in a tire.

2. A device of the kind described including a graduated transparent testing tube adapted to be applied to an air-charging hose, a coupling for connecting the testing tube to a valve stem and having means for automatically opening the valve in said stem, a movable indicator head mounted in the testing tube for closing the same and for coöperation with graduations thereon, an air passageway in the indicator head, a check valve in said passageway arranged to close with the air pressure in a tire, and a spring under strain to move the indicator head against the air pressure in the valve stem.

3. A device of the kind described including a graduated transparent testing tube adapted to be applied to an air-charging hose, a coupling for connecting the testing tube to a valve stem and having means for automatically opening the valve in said stem, a movable indicator head mounted in the testing tube for closing the same and for coöperation with the graduations thereon, said indicator head having a pliable bell-shaped end arranged to engage the internal wall of the transparent testing tube, an air passageway in the indicator head, and a check valve in said passageway arranged to close with the air pressure in a tire.

In testimony whereof I affix my signature in presence of two witnesses.

DAVID D. GETMAN

Witnesses:
  WINIFRED I. WARD,
  HARRY D. KILGORE.